United States Patent [19]
Falco

[11] Patent Number: 5,287,900
[45] Date of Patent: Feb. 22, 1994

[54] RADIAL ARM ROUTER TABLE

[76] Inventor: Manuel G. Falco, 1506 N. Towner St., Santa Ana, Calif. 92706

[21] Appl. No.: 978,824

[22] Filed: Nov. 19, 1992

[51] Int. Cl.⁵ .................................................. B27C 5/10
[52] U.S. Cl. ................................ 144/134 A; 144/1 F;
144/134 R; 144/136 R; 144/137; 144/242 B;
144/286 A; 269/165; 269/180
[58] Field of Search ............. 144/1 R, 1 E, 1 F, 2 R,
144/134 R, 134 A, 136 R, 137, 242 B, 286 A;
83/406.1, 471.2, 471.3, 486.1, 761; 409/79, 218,
182; 269/165, 180, , 216, 224

[56] References Cited
U.S. PATENT DOCUMENTS 4,312,391  1/1982  Snow ..................................... 144/1 F
4,410,022 10/1983  Peterson ............................... 144/1 F
4,454,898  6/1984  Pavnica ................................ 144/1 F Primary Examiner—W. Donald Bray
Attorney, Agent, or Firm—Shook, Hardy & Bacon

[57] ABSTRACT

A radial arm router table is provided which utilizes a carriage to mount a router. The carriage is moveable along a radial arm to allow the router to cut a groove in a panel placed on the table. A guide arm is pivotally mounted for clamping against the panel to hold it in place during cutting operations. The guide arm also includes a groove within which a guide follower mounted on the carriage travels to stabilize the router near the router bit to ensure that the router bit travels along a straight path.

23 Claims, 2 Drawing Sheets

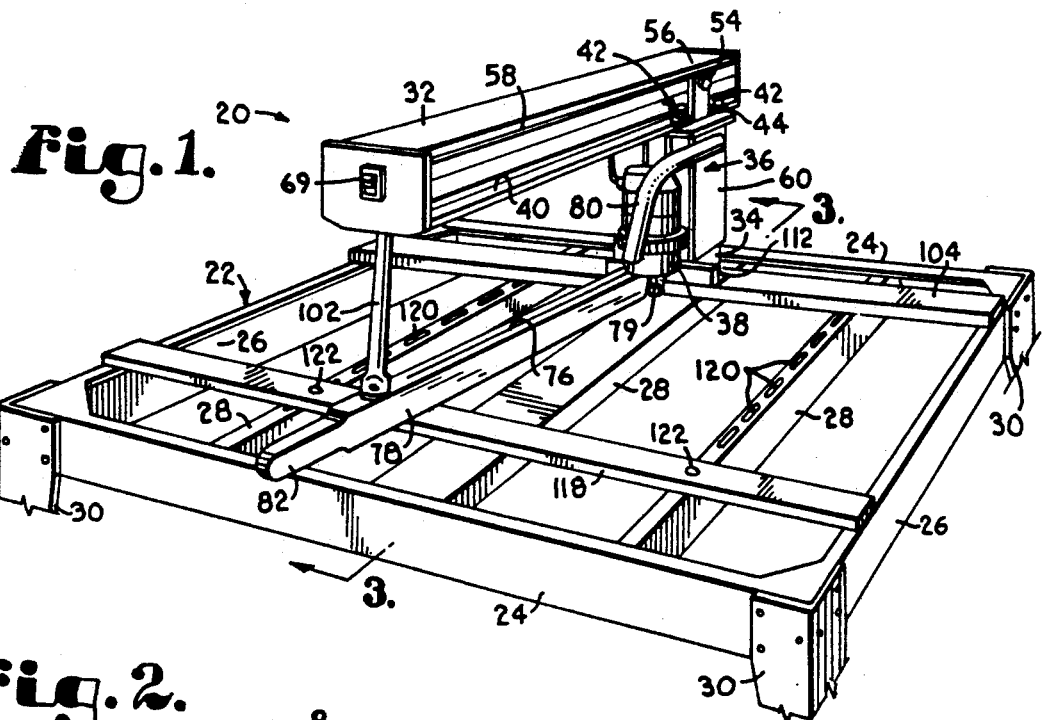
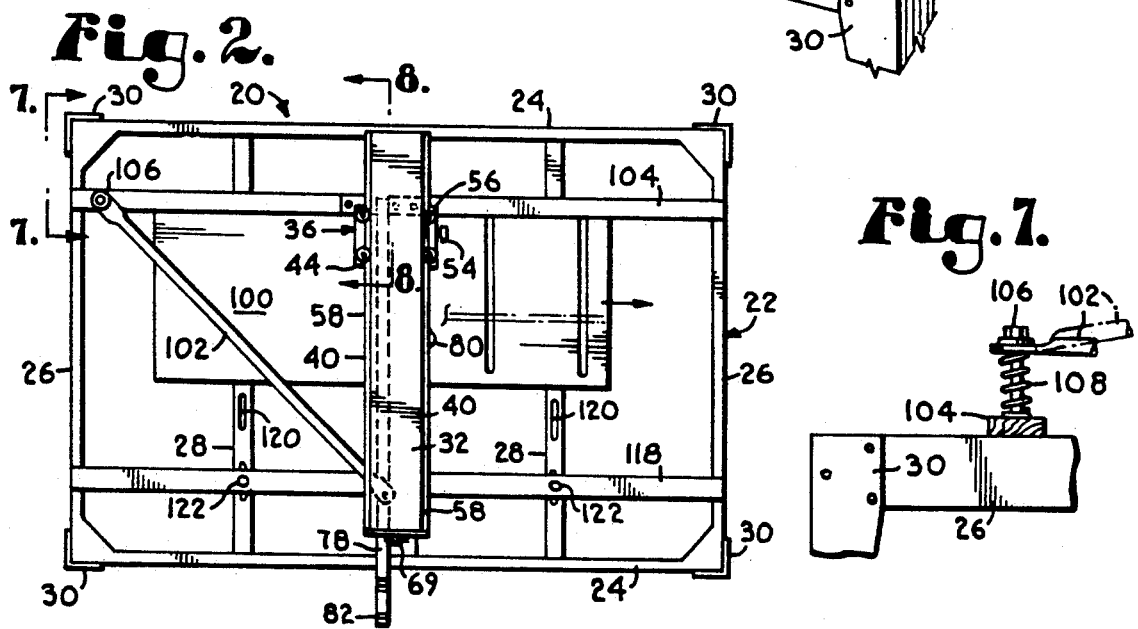
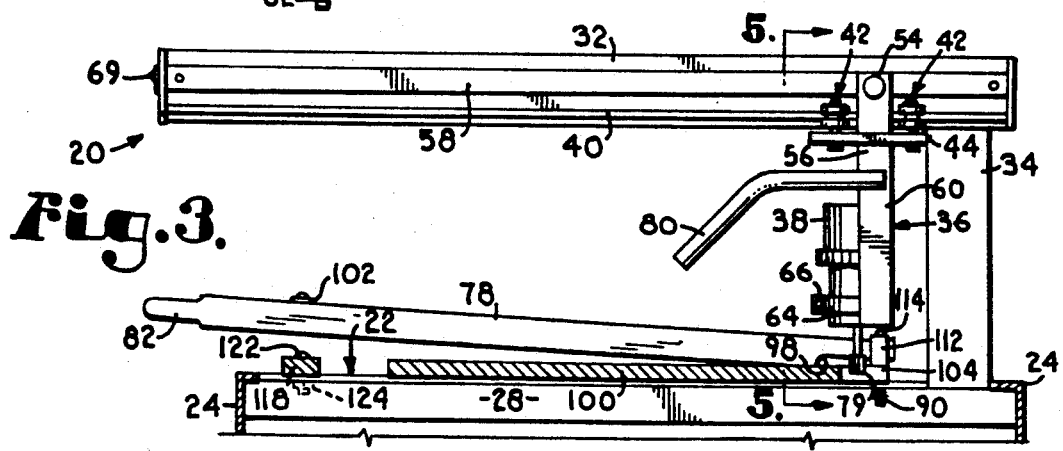

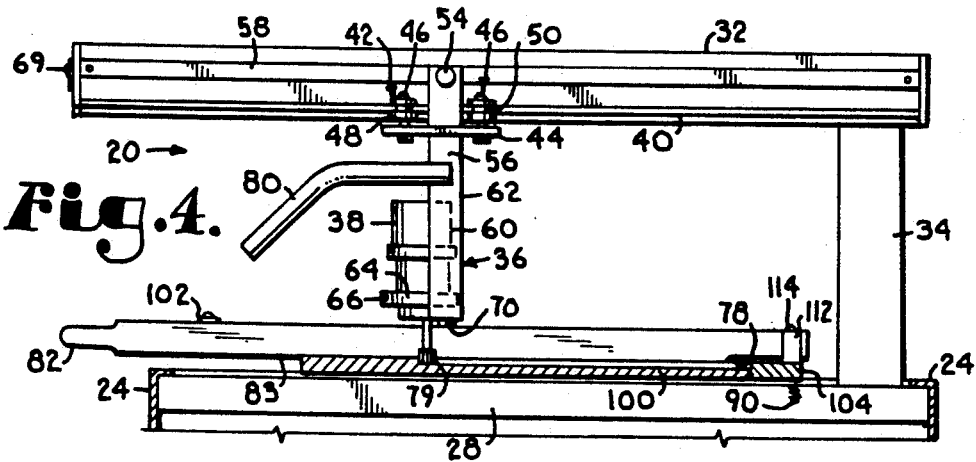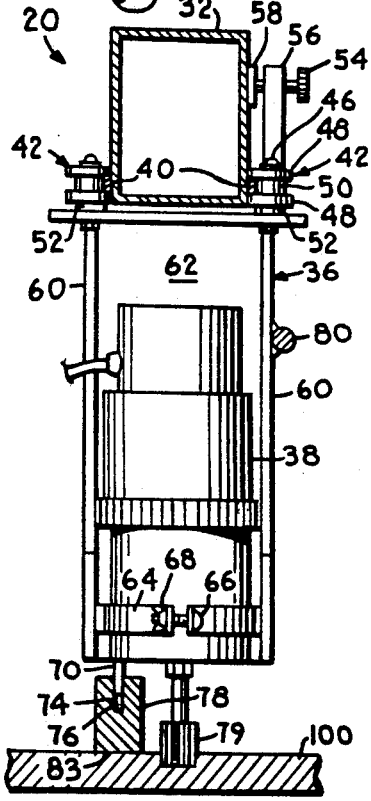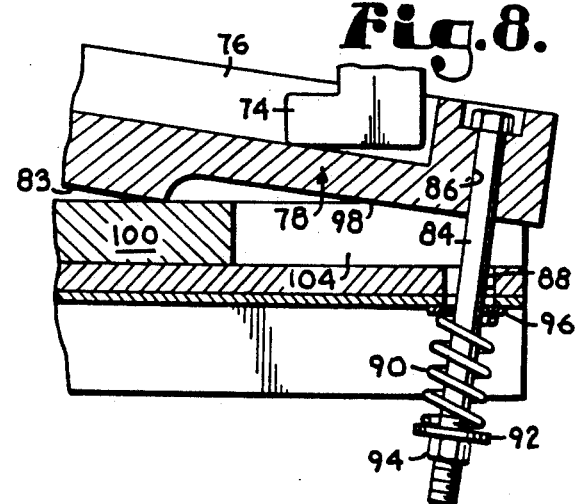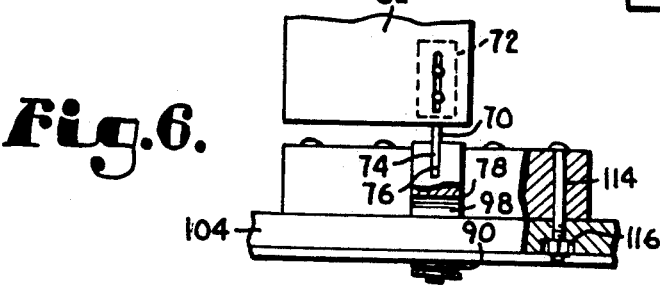

RADIAL ARM ROUTER TABLE

BACKGROUND OF THE INVENTION

This invention relates in general to routers and, more particularly, to an apparatus for supporting and clamping a workpiece and for stabilizing and guiding the router as it is being utilized to cut dado and other types of grooves in the workpiece.

During the making of cabinets a variety of dados and other types of grooves must be cut in the various panels of the cabinet to facilitate the joinder of the panels, shelves, kick plate and other cabinet components. A router employing a suitable bit is often used to cut these grooves but it takes a considerable amount of time to mark the location of the grooves and position the straight edge which must be utilized to guide the router along a straight line. While the router is generally suitable for cutting these grooves, care must be exercised during placement of the straight edge so that the bit travels along the desired path. In addition, the router must be held firmly against the straight edge to prevent the bit from wandering as the groove is being cut.

Dado grooves can also be cut using a dado blade mounted on a table saw. A significant disadvantage resulting from the use of such table saw mounted blades is the inability to view the surface being cut. In order to check the progress and alignment of the cut as it is being made, the saw must be turned off and the workpiece removed from the saw at periodic intervals. Moreover, because the dado blades rotate about an axis which can be spaced five to six inches from the cutting edges of the blades, there can be a tendency for the blades to waiver and cut a groove which is misaligned.

SUMMARY OF THE INVENTION

It is an object of this invention to provide a router table which can be utilized to quickly and accurately cut a variety of grooves into a cabinet panel with only a minimum amount of set up time so that cabinet production rates can be greatly increased.

It is also an object of this invention to provide a router table which securely mounts the router so that wobbling of the router is virtually eliminated, thereby allowing extremely straight and accurate dados and other grooves to be cut into a workpiece clamped onto the table.

It is another object of this invention to provide a router table with a guide arm that can be pivoted downward to exert a clamping force on a workpiece to prevent movement thereof during the cutting of the desired groove on the workpiece.

It is yet another object of this invention to provide a router table with a mechanism which allows the router to be stabilized in close proximity to the cutting edge of the router bit to prevent wandering of the bit and increase the accuracy of the cut.

It is a further object of this invention to provide a router table with a guide arm that not only clamps the workpiece and stabilizes the router, but also is self-adjusting to accommodate workpieces of varying thicknesses so that delays are not experienced setting up the table for a workpiece of a different thickness.

It is a still further object of this invention to provide a router table with a radial arm along which the router is moveable to make cuts along in a direction parallel to the longitudinal axis of the radial arm, but which also allows the router to be locked in position at a desired position along the radial arm so that the workpiece may be moved along a guide fence with the router making a cut in a transverse direction to the axis of the radial arm.

To accomplish these and other related objects of the invention, in one aspect the invention is related to an apparatus for use in cutting a workpiece with a router, said apparatus comprising:
- a support surface for supporting said workpiece;
- an overhead arm supported over said support surface; and
- a mount for said router, said mount being coupled with and moveable along said overhead arm.

In another aspect, the invention is directed to a guide arm positioned above the support surface and movable toward said support surface for clamping the workpiece between the guide arm and the support surface. The guide arm may also include a groove or other suitable means which cooperates with a follower positioned on the mount which carries the router. The groove and follower cooperate to stabilize the router in close proximity to the cutting bit to prevent wandering thereof and ensure that a straight and accurate cut is made in the workpiece. In a preferred embodiment, pivoting movement of the guide arm toward said support surface is provided by an anchor bolt which permits pivoting movement of the guide arm about a generally horizontal axis and a biasing spring carried on said anchor bolt for urging movement of the anchor bolt in one direction to cause pivoting movement of said guide arm away from the clamping position to allow for positioning of the workpiece on the support surface.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a front perspective view of a radial arm router table constructed in accordance with the present invention, the legs of the table having been shown in fragment;

FIG. 2 is a top plan view of the router table with a cabinet panel being shown positioned on the table in preparation for the cutting of grooves in the panel;

FIG. 3 is a fragmentary side elevational view of the router table taken in vertical section along line 3—3 of FIG. 1 in the direction of the arrows;

FIG. 4 is a fragmentary side elevational view of the router table and similar to the view shown in FIG. 3 but with the guide arm being shown lowered to its clamping position in engagement with the cabinet panel positioned on the table;

FIG. 5 is a fragmentary front elevational view of the router table main beam and guide arm taken in vertical section along line 5—5 of FIG. 3 in the direction of the arrows and shown on a slightly enlarged scale;

FIG. 6 is a fragmentary rear elevational view of a portion of the router table taken on an enlarged scale and with portions broken away to show the positioning of an L-shaped follower element within a groove in the guide arm;

FIG. 7 is a fragmentary side elevational view of a portion of the router table taken in vertical section along line 7—7 of FIG. 2 in the direction of the arrows to show the anchor pin for the guide arm brace, phantom lines being used to illustrate the position of the brace in the released position;

FIG. 8 is a fragmentary side elevational view of a portion of the router table taken in vertical section along line 8—8 of FIG. 2 in the direction of the arrows and on an enlarged scale to show the anchor bolt for the guide arm; and FIG. 9 is a fragmentary side elevational view of the same portion of the router table shown in FIG. 8 but with the guide arm shown in its clamping position.

DESCRIPTION OF THE PREFERRED EMBODIMENT

Referring now to the drawings in greater detail and initially to FIGS. 1-3, a radial arm router table in accordance with the present invention is represented broadly by the numeral 20. Router table 20 comprises a horizontal support surface 22 formed by peripheral front and rear beams 24 and connecting side beams 26. A plurality of intermediate beams 28 also extend between the front and rear beams. If desired, a sheet of solid material such as plywood may be placed on the beams 24, 26, and 28 to form the support surface 22.

The support surface 22 is supported by suitable legs 30 which are connected at the corners of the peripheral beams 24 and 26 and can be adjusted in length to place the support surface 22 at the desired height.

A radial arm 32 is supported over the support surface 22 by an upright brace 34 mounted to the rear beam 24. The radial arm 32 is formed from a box beam or other suitably rigid material and extends front to back over a central portion of the support surface 22. A carriage 36 that carries a router 38 is suitably mounted on the radial arm 32 for back and forth movement along the radial arm. Movement of the carriage 36 along the radial arm 32 may be accomplished in any suitable fashion, such as by providing a track 40 on opposite sides of the radial arm 32 and bearing assemblies 42 on the carriage 36. The tracks 40 may be formed from strips of wear resistant material such as various metals or a polymer such as nylon. A pair of spaced apart bearing assemblies 42 are support on and run along each track 40. As is best shown in FIG. 5, each bearing assembly 42 is mounted on and extends upwardly from a horizontal plate 44. Each bearing assembly 42 is identically constructed and comprises an upright spindle 46 which carries two rotatable wheels 48 that are maintained in spaced apart relationship by a rotatable spacer 50. A lower bearing 52 is placed between the lower wheel 48 and the horizontal plate 44 to permit the wheel 48 to rotate.

When the carriage 36 is positioned on the radial arm 32, the facing surfaces of the wheels 48 engage the upper and lower sides of the associated track 40 and the spacer 50 engages the exposed face of the track. Placement of the bearing assemblies 42 on opposite sides of the radial arm 32 maintains the assemblies in contact with the tracks 40 and allows the carriage 36 to be moved back and forth longitudinally along the radial arm. It will be appreciated that other mechanisms may alternatively be utilized to allow movement of the carriage on radial arm 32.

The carriage 36 may be locked at an intermediate position along the radial arm 32 by a suitable locking mechanism. As illustrated, the locking mechanism comprises a threaded member 54 which extends through a block 56 mounted on the upper horizontal plate 44 of carriage 36. The threaded member 54 can be tightened against the radial arm 32 to prevent relative movement between the carriage 36 and arm 32. Preferably, the threaded member 54 is tightened against a metal strip 58 which is placed on the radial arm 32 to prevent marring thereof.

The router 38 can be mounted to the carriage 36 in any suitable fashion. The carriage 36 includes upright side plates 60 and a rear plate 62 which is joined to the side plates 60 to enclose the back side of the carriage 36. The side and rear plates are welded or otherwise connected to the upper horizontal plate 44 for movement therewith. Straps 64 are connected to the side plates 60 and encircle a portion of the body of the router 38 to hold it tightly against the rear plate 62. The straps 64 are joined by a screw 66 and wing nut 68 which, when tightened, cause the router 38 to be securely held in place. Other devices may additionally or alternately be used to mount the router 38. An on/off switch 69 for the router 38 is mounted at the forward end of the radial arm 32 within easy reach of the table operator.

The carriage 36 also includes a guide follower 70 which extends downwardly below the carriage. Turning additionally to FIG. 6, it can be seen that the guide follower 70 comprises an upper base portion 72 which is mounted to the forward face of the rear carriage plate 62. A rigid L-shaped follower element 74 extends downwardly from the base portion 72 and is received within a groove 76 formed in a guide arm 78. The follower element 74 and groove cooperate to stabilize a cutting bit 79 of the router 38 and guide it along a straight path during cutting operations. A handle 80 is also joined to one of the side plates 60 and extends forwardly a sufficient distance to place it within reach of an operator standing in front of the router table 20.

The guide arm 78, as can be seen in FIGS. 1-5, extends forwardly from the rear portion of the router table 20 and has a forward end 82 shaped to form a handle for grasping by the table operator. The guide arm 78 is elongated and has a flat bottom surface 83. Various materials can be used for guide arm 78, but wood is generally preferred because it provides the necessary strength and rigidity but resists marring wood panels when they are clamped under the guide arm.

As is best seen in FIGS. 8-9, an anchor bolt 84 extends through a countersunk vertical hole 86 in a rear portion of the guide arm 78. The anchor bolt 84 is itself mounted so that it can be moved up and down along its longitudinal axis to permit the guide arm 78 to be raised and lowered. This movement of the anchor bolt 84 is accomplished by extending the anchor bolt through an oversized opening 88 in the center intermediate beam 28 and placing a biasing spring 90 on that portion of the shaft of the anchor bolt which extends below the beam. A lower flat washer 92 and a nut 94 placed on the shaft of the anchor bolt 84 act as an adjustable stop to vary the downward force exerted by the spring 90 on the anchor bolt. The upper end of the spring 90 bears against an upper flat washer 96 which is mounted on the bolt 84 and is in contact with the lower surface of the intermediate beam 28.

It can be seen that the spring 90 exerts a downward biasing force on the anchor bolt 84 which in turn causes the guide arm 78 to pivot upwardly at its forward end. In order to facilitate this pivoting movement of the guide arm 78, a cutout 98 is provide along a rear undersurface thereof. The guide arm 78 pivots about a horizontal axis, but the pivot axis is able to move slightly vertically and horizontally as compression on the spring 90 is exerted and released. This rocking movement allows sheets of material such as cabinet panels 100 of varying thickness to be inserted between the guide arm 78 and the table support surface 22. The panels 100 can then be clamped in place by simply grasping the forward handle 82 on the guide arm 78 and lowering the guide arm so that its entire bottom surface 83 is in engagement with the panel 100.

As is best shown in FIG. 2, the guide arm 78 is held against lateral movement by a brace 102 which is connected at one end to a forward portion of the guide arm. The brace 102 extends diagonally toward a corner of the table 20 and the other end of the brace 102 is connected to a laterally extending fence 104. As can be seen in FIG. 7, the end of the brace 102 is connected to fence 104 in a manner which allows the brace 102 to pivot up and down with the guide arm 78. This movement is provided by an anchor pin 106 which extends through the brace 102 and mounts a biasing spring 108. The spring 108 urges the brace 102 against an upper washer 110 which is held in place by the head of the anchor pin 106. When the guide arm 78 is moved up or down, corresponding movement of the brace 102 is permitted by compression or extension of spring 108.

The guide arm 78 is also held against lateral movement by a pair of blocks 112 that contact the vertical sides of the rear portion of the guide arm 78, as is best shown in FIG. 6. These blocks are suitably secured to fence 104 by anchor bolts 114 and nuts 116.

If desired, an adjustable auxiliary fence 118 can be provided spaced from but parallel to fence 104. Adjustment of fence 118 can be accomplished in various suitable fashions, such as by providing closed-end slots 120 in the intermediate beams 28. Bolts 122 which extend through the fence 104 each carrying a nut 124 (FIG. 3) that can be tightened against an undersurface of the associated beam 28 once the fence 104 has been placed in the desired position.

In use, radial arm router table 20 can be used to cut a variety of grooves in panels 100. The appropriate bit 79 is simply placed in the router 38 and adjusted to cut at the desired depth. The intended location of the groove is marked on the panel 100 which is then placed on the table support surface 22. The panel 100 is positioned against the fence 104 with the marking for the groove extending at a right angle to the fence 104 and in alignment with the cutting path of the router 38. It will be appreciated that cuts other than at right angles to an edge of the panel 100 can also be made by aligning the marking with the guide arm 78. Once the panel 100 has been properly positioned, the guide arm 78 is then lowered and held firmly against the panel 100 to clamp it in place and prevent it from moving during cutting of the groove.

After the panel 100 has been positioned and clamped into place, the switch 69 is turned on to activate the router 38. The router 38 is then pulled forwardly along the desired length of cut by grasping the carriage handle 80. During movement of the router 38 along the radial arm 32, the router is stabilized not only by the overlying radial arm 32 but also by the guide arm 78 as the L-shaped follower element 74 travels within the groove 76 in the guide arm 78. Because the follower element 74 and groove 76 are located in close proximity to the router bit 79, there is little opportunity for the bit to wander from its desired path, such as when grain variations or knots are encountered in the panel 100. If the router 38 were supported only by the overhead radial arm 32, the likelihood of deviations from a perfectly straight cut would be greatly increased because the carriage 36 might wobble on the tracks 40. By additionally stabilizing the router 38 and bit 79 near the panel 100 being cut, the opportunity for wobbling or flexure of the carriage 36 is virtually eliminated. It can thus be appreciated that the table 20 allows a panel 100 to be quickly positioned and securely held in the desired position as an exceedingly accurate cut is made in the panel 100.

In those instances where it is desired to cut a groove along the long dimension of panel 100, the router table 20 can be readily adapted for such purposes. The panel 100 is positioned against the stationary fence 104 and the adjustable fence 118 is then brought into engagement with the opposite side edge of the panel 100. Once the panel 100 has been positioned, the carriage 36 is simply maneuvered to place the router bit 79 in alignment with the intended cut and the carriage is then locked into place by turning the threaded member 54 against the metal strip 58 carried by the radial arm 32. The guide arm 78 is allowed to remain in its released position as the panel 100 is then moved longitudinally until the cut has been completed. If needed in order to provide sufficient clearance beneath the guide arm 78, the nut 94 on the anchor bolt 84 can be loosened to allow the bolt 84 to move further in an upward direction. Notably, even when the router table 20 is being utilized to make these transverse cuts, the guide follower 70 remains within the groove 76 in the guide arm 78 to stabilize the router 38 in close proximity to the cutting action of the router bit 79 to ensure a straight and highly accurate cut.

In certain cabinetmaking operations a plurality of panels 100 may be cut identically. In such operations, it will be desirable to provide a template which can be used to mark the locations of the dados and other grooves which will be cut on the router table 20 so that the locations of the cuts can be quickly marked. Because of the high accuracy of the cuts made on the router table 20, the markings made by the template need only be placed along one edge of panel 100. When the router bit 79 is aligned with such markings, the operator can be assured that the cut will be straight and will extend at a right angle to the side edge aligned with the stationary fence 104.

The unique construction and mounting of the guide arm 78 are also particularly noteworthy. The use of anchor bolt 84 with biasing spring 90 urges the guide arm 78 toward a released position with the forward end pivoted upward to allow a panel 100 to be placed beneath the guide arm, as is shown in FIG. 8. When the panel 100 is in the desired position, the arm 76 can then be lowered to clamp against the panel 100 as shown in FIG. 9. In this position, the spring 90 is in compression and exerts a downward force along the axis of the anchor bolt 84 to maintain the rear portion of the guide arm 78 securely against panel 100. Because the anchor bolt 84 is able to move vertically, the guide arm 78 can accommodate panels 100 of varying thickness without requiring adjustment of the guide arm or its mounting components. If such adjustment is required, such as if a thin veneer is being cut, the nut 94 on the anchor bolt 84 need only be turned in the appropriate direction to bring the rear portion of the guide arm 78 into contact with the veneer.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for use in cutting a workpiece with a router, said apparatus comprising:
   a support surface for supporting said workpiece;
   an overhead arm supported over said support surface;
   a mount for said router, said mount being coupled with and moveable along said overhead arm; and
   a guide arm positioned above said support surface and moveable toward said support surface for clamping the workpiece between the guide arm and the support surface.

2. The apparatus as set forth in claim 1, including cooperating means on said mount and guide arm for stabilizing said mount on the guide arm as the mount moves along the overhead arm.

3. The apparatus as set forth in claim 2, wherein said cooperating means comprises a groove in either the mount or the guide arm and a follower carried by the other of the mount or the guide arm and positioned within the groove.

4. The apparatus as set forth in claim 3, wherein said guide arm is connected to an anchor bolt which permits pivoting movement of the guide arm about a generally horizontal axis.

5. The apparatus as set forth in claim 4, wherein said anchor bolt includes biasing means for urging movement of the anchor bolt in one direction to cause pivoting movement of said guide arm.

6. The apparatus as set forth in claim 5, wherein said anchor bolt is mounted to enable rocking along a longitudinal axis of the guide arm and resulting movement of the horizontal axis about which the guide arm pivots.

7. The apparatus as set forth in claim 3, including a locking mechanism coupled with the mount for locking the mount at a preselected position along the overhead arm.

8. The apparatus as set forth in claim 3, including tracks on said overhead arm and wherein said mount comprises a carriage having bearing assemblies engaged with and moveable along said tracks.

9. An apparatus for use in cutting a workpiece with a router, said apparatus comprising:
   a support surface for supporting said workpiece;
   an overhead arm supported over said support surface;
   a carriage moveable along said overhead arm, said carriage being constructed for mounting said router in an orientation with a cutting bit extending downwardly from said router and rotating about a generally vertical axis; and
   said overhead arm, said guide arm being engaged with a portion of the carriage to stabilize the carriage as it is moved along the overhead arm.

10. The apparatus as set forth in claim 9, wherein said portion of the carriage comprises a follower element which rides along a surface of the guide arm during movement of the carriage along the overhead arm.

11. The apparatus as set forth in claim 10, wherein said surface of the guide arm comprises a groove extending with the guide arm along a portion of its length, said groove being sized for receiving said follower element.

12. The apparatus as set forth in claim 11, wherein said guide arm is connected to an anchor bolt which permits pivoting movement of the guide arm about a generally horizontal axis, whereby said guide arm is movable toward said support surface for clamping the workpiece between the guide arm and the support surface.

13. The apparatus as set forth in claim 12, wherein said anchor bolt includes biasing means for urging movement of the anchor bolt in one direction to cause pivoting movement of said guide arm.

14. The apparatus as set forth in claim 13, wherein said anchor bolt is mounted to enable rocking along a longitudinal axis of the guide arm and resulting movement of the horizontal axis about which the guide arm pivots.

15. The apparatus as set forth in claim 13, including a brace connected to the guide arm for resisting movement of said guide arm about a longitudinal axis of the anchor bolt.

16. The apparatus as set forth in claim 15, including a locking mechanism coupled with the carriage for locking the carriage at a preselected position along the overhead arm.

17. The apparatus as set forth in claim 16, including tracks on said overhead arm and wherein said carriage comprises bearing assemblies engaged with and moveable along said tracks.

18. An apparatus for use in cutting a workpiece with a router, said apparatus comprising:
   a support surface for supporting said workpiece;
   an overhead arm supported over said support surface;
   a carriage supported by and moveable along said overhead arm;
   a router mounted on said carriage in an orientation to drive a cutting bit extending downwardly from said router about a generally vertical axis;
   a guide arm positioned above said surface and below said overhead arm, said guide arm being engaged with a portion of the carriage to stabilize the carriage as it is moved along the overhead arm; and
   means mounting said guide arm for permitting pivoting movement of the guide arm toward said support surface to clamp the workpiece between the guide arm and the support surface.

19. The apparatus as set forth in claim 18, wherein said portion of the carriage comprises a follower element which rides within a groove in the guide arm during movement of the carriage along the overhead arm.

20. The apparatus as set forth in claim 19, wherein said means mounting the guide arm comprises an anchor bolt which permits pivoting movement of the guide arm about a generally horizontal axis and a biasing spring carried on said anchor bolt for urging movement of the anchor bolt in one direction to cause pivoting movement of said guide arm.

21. The apparatus as set forth in claim 20, including a brace connected to a forward portion of the guide arm for resisting movement of said guide arm about a longitudinal axis of the anchor bolt.

22. The apparatus as set forth in claim 21, including a locking mechanism coupled with the carriage for locking the carriage at a preselected position along the overhead arm.

23. The apparatus as set forth in claim 22, including tracks on said overhead arm and wherein said carriage includes bearing assemblies engaged with and moveable along said tracks.

* * * * *